Jan. 14, 1941.      J. W. FITCHES      2,228,698
DAIRY UTENSIL
Filed March 28, 1939      2 Sheets-Sheet 2
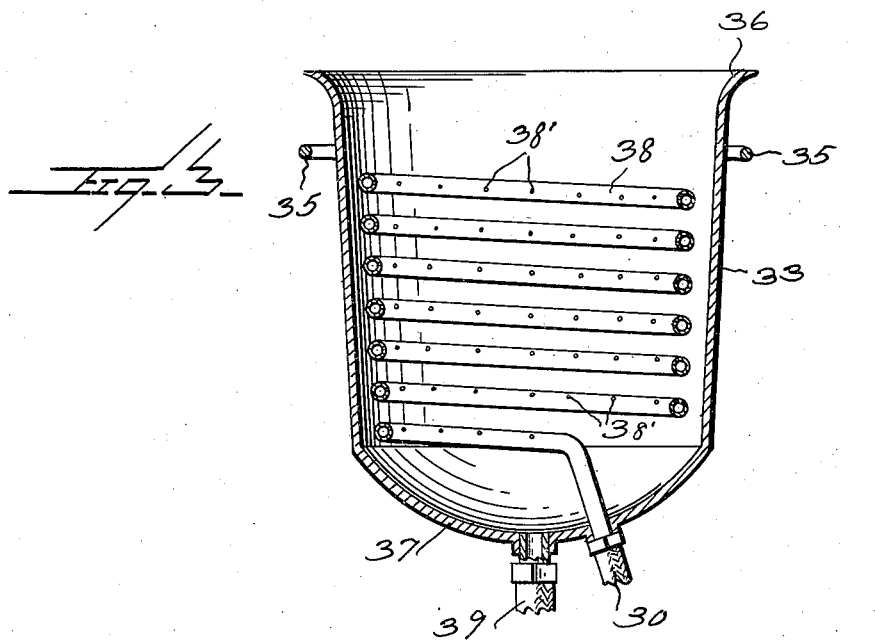
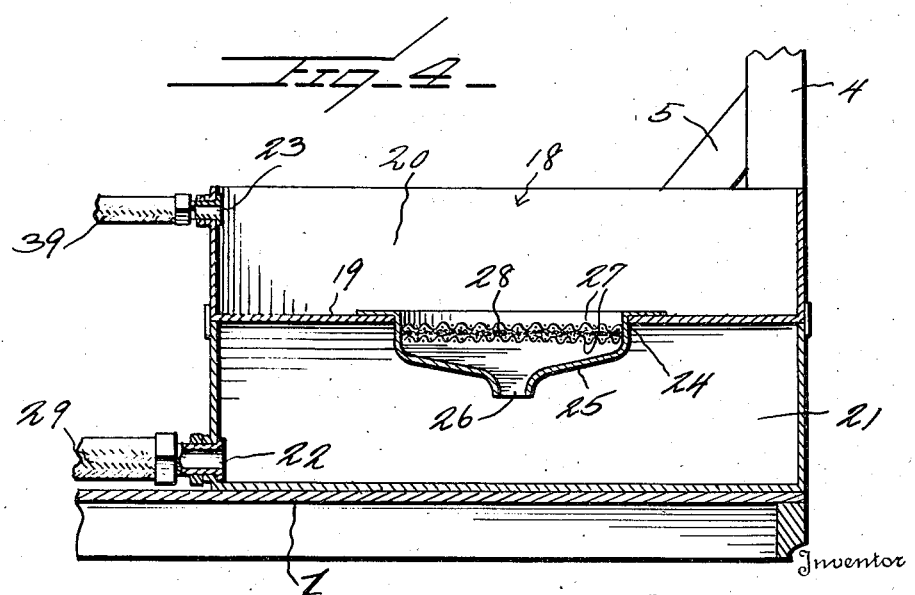
Inventor
J. W. Fitches
By Watson E. Coleman
Attorney Patented Jan. 14, 1941

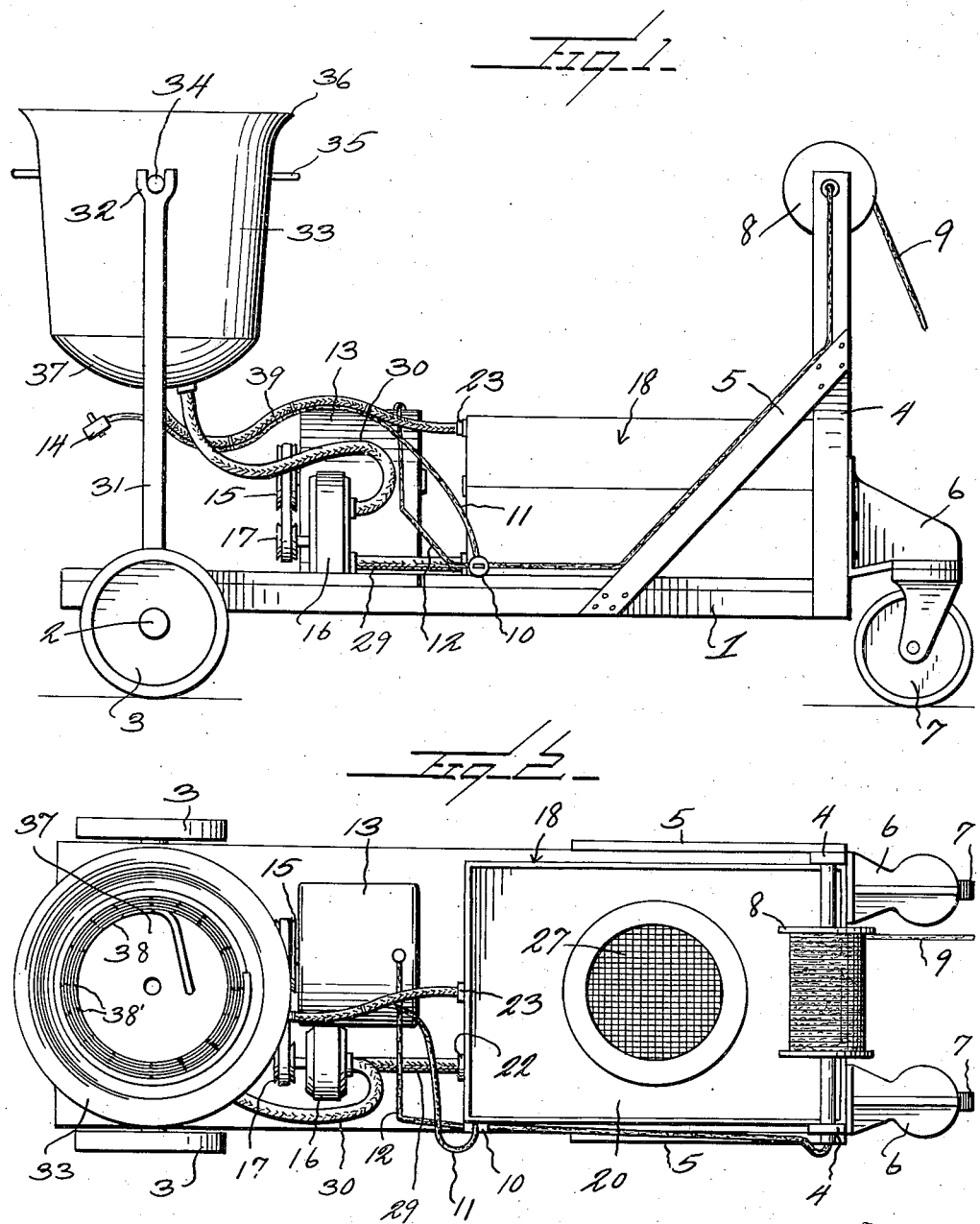

2,228,698

UNITED STATES PATENT OFFICE 2,228,698

DAIRY UTENSIL

James W. Fitches, Salt Lake City, Utah, assignor to Chris H. Stoven, Salt Lake City, Utah Application March 28, 1939, Serial No. 264,611

2 Claims. (Cl. 119—1)

This invention relates generally to dairy equipment and pertains particularly to an improved udder washing machine.

The present invention has for its primary object to provide an improved udder washing machine wherein the water or washing solution is circulated from a receptacle to the udder basin and carried back to the receptacle through a cleaner or filter unit, thus making it feasible to use the same water for washing the udders of several different cows.

Another object of the invention is to provide an udder washing machine wherein the washing basin, receptacle and filter unit, together with a circulation maintaining means, are all mounted upon a wheeled structure which may be readily transported from one animal to the other, so that by moving the washing machine along as the milking operation progresses, the udders of the animals may be thoroughly cleansed immediately preceding the milking operation.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the machine embodying the present invention.

Fig. 2 is a top plan view of the same.

Fig. 3 is a vertical sectional view through the udder basin.

Fig. 4 is a vertical longitudinal section through the fluid receptacle.

Referring now more particularly to the drawings, the numeral 1 generally designates the frame or platform of the wheeled structure upon which the washing apparatus forming a part of the present invention is mounted. This platform at one end is supported upon an axle 2 which in turn is supported by the rear wheels 3 while at the forward end, the platform has the upstanding frame structure 4 securely held by the braces 5 and having attached to its front the forwardly extending brackets 6 to each of which a castor wheel 7 is attached. By the provision of these castor wheels the structure may be easily moved from place to place, and by providing the two front wheels, the necessary stability is given to the structure so that all danger of the same tipping over is avoided.

The frame structure 4 constitutes a handle or handle bar by which the machine may be moved around, and upon this frame is mounted a suitable reel 8 on which is wound a supply of electric cord 9, one end of which is adapted for connection with a suitable source of electric current such as a house supply line or the like, the other end of the cord being electrically connected to the receptacle 10, at which point connection is made with a control switch current line 11 and a supply line 12 leading to a motor structure (not shown) which is enclosed within the housing 13. The line 11 connects with a control switch 14 which is conveniently located for the operator of the machine so that the operating motor may be started and stopped as desired.

Connected with the motor which is enclosed in the housing 13, is a drive pulley 15 and disposed adjacent the motor is a fluid circulating pump 16 having a driven pulley 17 which is connected with the drive 15.

Mounted upon the platform 1, preferably at the forward end of the same, is a fluid receptacle which is indicated generally by the numeral 18. This receptacle may be open at its top or may have a suitable cover thereover and it is horizontally divided by the partition wall 19 which divides it into the upper and lower chambers 20 and 21, respectively. One wall of the receptacle 18 is provided with an outlet nipple 22 which leads from the bottom of the lower chamber 21 and leading through a wall of the receptacle into the upper part of the upper chamber 20 is an inlet nipple 23.

The wall 19 is provided with a central opening 24 in which is secured the downwardly extending funnel-like trap 25 which is provided with the central outlet opening 26. In the upper part of this trap 25, there are secured the two screens 27 and between these screens is secured a layer or sheet of filtering material 28. This filtering material may be in the form of one or more sheets of standard filtering paper or it may be in the form of a suitable filtering felt or any other suitable substance.

The outlet nipple 22 for the discharge chamber 21 is connected by a pipe or hose 29 with the intake side of the pump 16. The discharge side of this pump has connected therewith a hose 30.

Upon the platform 1, preferably at the rear end thereof, is a pair of standards 31, the upper ends of which are notched, as indicated at 32, Adapted for suspension by and between the standards 31 is a receptacle 33, which may be referred to as the udder cup or basin, and this basin is provided with supporting trunnions 34 which engage in the notches of the standards 31, so that the basin will be oscillatably suspended therebetween. Suitable handles 35 are secured to the basin to facilitate moving the same. The mouth of the basin is outwardly flared in the manner of a bell, as indicated at 36, while the bottom part is rounded downwardly or convex, as indicated at 37.

Within the basin 33 and in close proximity to the wall thereof is a pipe coil 38, the convolutions of which are provided at the inner sides thereof with the spray apertures 38' and the lower end of this pipe coil passes through the bottom 37 of the basin and is connected with the wash fluid supply pipe 30 which leads from the pump. At the center of the bottom of the basin, a discharge or an outlet pipe 39 is connected which has its other end connected with the inlet nipple 23 which discharges into the upper or fluid receiving chamber 20 of the receptacle 18.

The use or operation of the present machine will, it is believed, be readily apparent. The receptacle 18 is supplied with a suitable washing fluid which may be plain water or water having a suitable antiseptic or cleansing substance added thereto. The machine is rolled into the proper position to permit the placing of the udder into the basin 33 whereupon the operator, by turning on the switch 14, will start the electric motor and the pump to running and the pump will draw the fluid from the lower chamber 21 of the receptacle and discharge it from the spray apertures 38' in the basin, against the udder and teats, thus thoroughly washing off the same. The wash fluid will be drawn from the basin through the pipe 39 and discharged back into the receptacle 18 into the upper chamber 20, from which it will flow into the trap 25 through the filtering unit and back into the lower chamber 21 where it may be used over again. Thus it will be seen from the foregoing that the device herein described provides a simple and efficient means of thoroughly cleansing or washing the udders of cows before milking and because of the fact that the power source for circulating the fluid is assembled with the other units upon the movable platform, the machine may be readily transported from one position to another and does not have to be connected or hooked up to any other mechanism for its operation except that the current cord 9 must be attached to a suitable source of electric current for the running of the pump operating motor.

What is claimed is:

1. A cow's udder washing machine, comprising a basin formed to receive the udder, a movable support for the basin and supporting the same at an elevation to be disposed beneath the animal in position to receive the udder, a spray coil disposed within the basin, a receptacle having an upper and lower chamber, the lower chamber of the receptacle being designed to contain a washing fluid, a pump between said lower chamber and said unit for removing the fluid from said lower chamber and forcing it under pressure into said spraying unit for discharge therefrom into and toward the center of the basin, means for returning the fluid by gravity from the basin to the upper chamber of the receptacle, and means for cleansing the fluid and returning it from the upper to the lower chamber of the receptacle.

2. A cow's udder washing machine, comprising a wheeled platform, a pair of standards supported in spaced relation upon said platform, an udder receiving receptacle disposed between said standards, a pair of trunnions carried by the receptacle and pivotally connected with said standards whereby the receptacle is oscillatably supported, the standards being of a height to support the receptacle at an elevation whereby it may be disposed beneath the cow in position to receive the udder, a spraying pipe coil within the receptacle having spray apertures in the inner sides of the convolutions thereof, a wash fluid receptacle supported upon the platform having an inlet and an outlet, a pipe line connecting said inlet with the lower part of the receptacle, the receptacle being at an elevation to cause fluid to flow by gravity therefrom through said pipe line to the receptacle, pumping means having an inlet and an outlet, said pumping means inlet being connected with the outlet of the wash fluid receptacle, and a pipe line connecting the outlet of the pumping means with said spraying unit coil.

JAMES W. FITCHES.